(12) United States Patent
Reiche

(10) Patent No.: US 8,671,762 B2
(45) Date of Patent: Mar. 18, 2014

(54) ULTRASONIC SENSOR

(75) Inventor: Martin Reiche, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 13/056,581

(22) PCT Filed: Jun. 3, 2009

(86) PCT No.: PCT/EP2009/056776
§ 371 (c)(1),
(2), (4) Date: Apr. 4, 2011

(87) PCT Pub. No.: WO2010/012533
PCT Pub. Date: Feb. 4, 2010

(65) Prior Publication Data
US 2011/0259107 A1    Oct. 27, 2011

(30) Foreign Application Priority Data

Jul. 31, 2008    (DE) .......................... 10 2008 040 905

(51) Int. Cl.
*G01N 9/04*    (2006.01)
(52) U.S. Cl.
USPC .............................................. 73/633; 73/649
(58) Field of Classification Search
USPC ............ 73/633, 642, 649; 310/322, 334, 335, 310/336
See application file for complete search history.

(56) References Cited

U.S. PATENT DOCUMENTS

| | | | | |
|---|---|---|---|---|
| 5,446,332 A * | 8/1995 | Rapps et al. | .................. | 310/324 |
| 5,495,766 A * | 3/1996 | Kota et al. | ....................... | 73/652 |
| 5,629,690 A * | 5/1997 | Knoll | ............................. | 340/904 |
| 5,869,764 A * | 2/1999 | Schulte | ........................... | 73/620 |
| 6,250,162 B1 * | 6/2001 | Amaike et al. | .................. | 73/642 |
| 6,370,086 B2 * | 4/2002 | Li | .................................. | 367/178 |
| 6,465,935 B1 * | 10/2002 | Wannke et al. | ............... | 310/324 |
| 7,385,487 B2 * | 6/2008 | Simonazzi | .................... | 340/435 |
| 7,554,248 B2 * | 6/2009 | Oda et al. | ....................... | 310/348 |
| 8,053,950 B2 * | 11/2011 | Niemann | ....................... | 310/324 |
| 8,080,922 B2 * | 12/2011 | Reiche | .......................... | 310/348 |
| 8,393,219 B2 * | 3/2013 | Hoenes | ........................... | 73/633 |

FOREIGN PATENT DOCUMENTS

| | | |
|---|---|---|
| DE | 3441684 | 3/1986 |
| DE | 197 27 877 | 1/1999 |
| DE | 10 2006 011 155 | 9/2007 |
| EP | 0 678 853 | 10/1995 |
| JP | 57-166498 | 4/1956 |
| JP | 1-232900 | 9/1989 |
| JP | 2001-128292 | 5/2001 |
| JP | 2002-58091 | 2/2002 |
| SU | 174452 | 8/1965 |
| SU | 862061 | 9/1981 |
| WO | 92/02795 | 2/1992 |

* cited by examiner

*Primary Examiner* — J M Saint Surin
(74) *Attorney, Agent, or Firm* — Kenyon & Kenyon LLP

(57) ABSTRACT

An ultrasonic sensor is described having a housing which has a circumferential side wall and a base surface. A transducer element for generating ultrasonic vibrations is mounted on the base surface. The side wall includes a lower side wall section, in which the side wall has an essentially rotationally asymmetrical profile in a plane parallel to the base surface, and an upper side wall section in which the side wall changes to an essentially rotationally symmetrical profile toward an upper edge of the side wall. In other respects, the present system provides a parking assistance system for a vehicle, having a control unit and such an ultrasonic sensor, as well as a method for manufacturing an ultrasonic sensor.

14 Claims, 4 Drawing Sheets

ULTRASONIC SENSOR

FIELD OF THE INVENTION

The present invention relates to an ultrasonic sensor, a parking assistance system for a vehicle having an ultrasonic sensor, and a corresponding method for manufacturing an ultrasonic sensor.

BACKGROUND INFORMATION

Ultrasonic sensors are used in motor vehicles for parking assistance systems, for example, which during parking measure the remaining distance from obstacles bordering a parking space. Such parking assistance systems typically include one or multiple ultrasonic sensors and a control unit, the ultrasonic sensors containing an ultrasonic transducer which is used both for transmitting and receiving ultrasonic signals. In particular, a key functional requirement for the ultrasonic sensors is a so-called proximity measuring capability at a distance range of less than 30 cm.

German patent document DE 3 441 684 A1 discusses an electroacoustic transducer having a cap- or pot-shaped housing whose base surface is designed as a diaphragm. A piezoelectric ceramic body as a transducer element rests on the diaphragm, and is covered by a damping foam layer on the side opposite from the diaphragm. In order to generate sound radiation having a particularly small aperture angle in a vertical plane, but sound radiation having a relatively large aperture angle in a horizontal plane, the contour of the diaphragm and of the side wall surrounding same has an approximately elliptical, i.e., rotationally asymmetrical, design in a plane perpendicular to the direction of sound radiation. In such designs it is disadvantageous that, in particular in pulsed operation, not only the diaphragm but also the side wall is excited to oscillations of secondary modes.

German patent document DE 197 27 877 A1 discusses an ultrasonic transducer having a pot-like housing which has an annular wall, and a base surface as a vibrating diaphragm. A stabilizing ring is provided on the exterior of the wall to impart greater rigidity to the housing and limit the ultrasonic vibration essentially on the pot base as a vibrating diaphragm. However, in particular for pulsed transmission excitation of the ultrasonic transducer, this design results in excitation of secondary modes, which typically correspond to tilting and crumpling motions of the diaphragm pot wall. These secondary modes impair the proximity measuring capability of the ultrasonic sensor, since they prolong the attenuation time after transmission excitation, and beat patterns overlap with small reflected ultrasonic signals from nearby objects.

It is therefore desirable to further reduce the excitation of secondary modes in the transmission mode of ultrasonic sensors, thus improving the proximity measuring capability.

SUMMARY OF THE INVENTION

Accordingly, an ultrasonic sensor is provided which has a housing having a circumferential side wall and a base surface, i.e., having a pot shape or cap shape. A transducer element for generating ultrasonic vibrations, a piezoelectric element, for example, is mounted on the base surface. The side wall includes a lower side wall section in which the side wall has an essentially rotationally asymmetrical profile in a plane parallel to the base surface. The side wall also includes an upper side wall section in which the side wall changes to an essentially rotationally symmetrical profile toward an upper edge of the side wall.

As a result of the design of the two side wall sections which are distinguished by the rotationally asymmetrical profile in the lower side wall section which directly surrounds the base surface, and by the transition to a rotationally symmetrical profile at the upper edge of the side wall, the undesired indirect excitation of, for example, secondary oscillation modes as the result of tilting and/or crumpling vibrations of the side walls upon excitation of a main or working oscillation mode of the base surface is significantly reduced by the transducer element in comparison to conventional ultrasonic sensors.

The ratios of the characteristics of the working mode to the interfering secondary modes are ascertainable, among other ways, by electrical measurements at sensor housings which are not damped by a foam filling or similar material. The individual modes are each characterized by an equivalent electrical circuit diagram. The characteristics of the secondary modes may be assessed on the basis of the ratios of the damping of the individual secondary modes to the main mode. Comparative measurements using conventional ultrasonic sensors having a pot-like housing with a constant side wall profile along the height of the side wall, and optionally a stabilizing ring on the exterior of the side wall, show an increase in the damping of the secondary modes by a factor of 5 to 10.

For ultrasonic sensors which are damped by a foam filling or the like and, depending on the application, optionally incorporated into additional casings which enclose the housing during operation, the characteristic shapes of the individual modes and the increased damping of the secondary modes compared to the working mode may be detected with the aid of laser interferometry. The increased damping of the secondary modes also results in a directly detectable improved reduction in interfering beats in the electrically amplified reception signal of the ultrasonic sensor which compete with the small reflecting ultrasonic signals of nearby objects, thus allowing improved proximity measuring capability of the ultrasonic sensor according to the present invention.

According to one refinement of the ultrasonic sensor, the side wall in the upper side wall section is at least predominantly tapered with respect to the lower side wall section; i.e., an average wall thickness of the side wall in the upper side wall section is less than in the lower side wall section. According to another refinement, the upper side wall section extends over more than 50% of an overall height of the housing. The upper side wall section may extend over less than 80% of the overall height of the housing. In these refinements the damping of the interfering secondary modes is particularly greatly increased.

According to one refinement, in the lower and upper side wall sections the housing has an essentially cylindrical outer contour. Such an ultrasonic sensor is particularly easy to install, since the lower and upper side wall sections are formed by the shape of the inner contour of the housing, while the outer contour may be provided, for example, in a shape which is identical to a conventional type of ultrasonic sensor. Thus, it is not necessary to modify the shape of surrounding parts of a vehicle, for example.

According to one refinement, the side wall has a circumferential outer thickening in the upper side wall section. This thickening acts as a stabilizing ring which results in greater rigidity of the housing, which reduces the occurrence of secondary modes in which the side walls are deflected. In addition, the mechanical robustness of the housing is improved. The outer thickening may extend along the upper edge of the side wall.

According to one refinement, the upper side wall section includes an inclined shape of an inner contour of the housing in a plane perpendicular to the base surface. For a cylindrical or generally rotationally symmetrical outer contour of the housing, for example, the plane perpendicular to the base surface may be a plane which passes through the axis of symmetry of the outer contour, a segment of the intersection line of the inner contour with the plane perpendicular to the base surface forming a straight line which is inclined with respect to the axis of symmetry of the outer contour. The segment of the intersection line may be inclined by approximately 45° relative to the base surface, so that, for example, the inner contour in places extends along the lateral surface of a cone having an aperture angle of 90°.

According to another refinement, the upper side wall section includes a curved shape of an inner contour of the housing in a plane perpendicular to the base surface. For a cylindrical or generally rotationally symmetrical outer contour of the housing, for example, the plane perpendicular to the base surface may be a plane which passes through the axis of symmetry of the outer contour, a segment of the intersection line of the inner contour with the plane perpendicular to the base surface forming a curved line. The inner contour may include an essentially quarter-circle-shaped curvature; i.e., a segment of the intersection line of the inner contour with the perpendicular plane extends in the shape of a quarter circle. Particularly advantageous vibration behavior of the housing with particularly high damping of secondary modes may be achieved in these two refinements.

According to one refinement, the upper side wall section includes a stepped shape of an inner contour of the housing in a plane perpendicular to the base surface. For a cylindrical or generally rotationally symmetrical outer contour of the housing, for example, the plane perpendicular to the base surface may be a plane which passes through the axis of symmetry of the outer contour, a segment of the intersection line of the inner contour with the plane perpendicular to the base surface forming a horizontal line, i.e., a line which is parallel to the base surface. Such a shape may be provided in a particularly simple manner.

The exemplary embodiments and/or exemplary methods of the present invention are explained below with reference to specific embodiments and the accompanying figures.

DETAILED DESCRIPTION

Figure 1A:
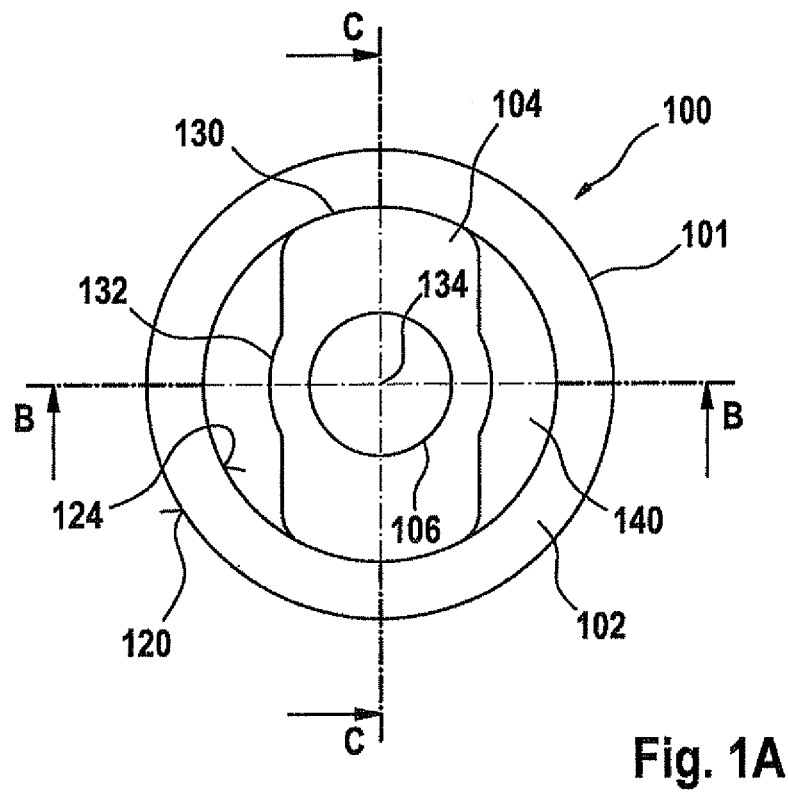
FIG. 1A shows a top view of an ultrasonic sensor according to one specific embodiment of the present invention.

Unless explicitly stated otherwise, identical or functionally corresponding elements are denoted by the same reference numerals in the figures.

FIG. 1A shows a top view of an ultrasonic sensor 100 which is suitable for use in a parking assistance system for a motor vehicle. The ultrasonic sensor includes a pot-like housing 101 having a base surface 104 and a side wall 102 which annularly encloses the base surface. Housing 101 is molded or milled from a metallic material such as aluminum, for example, and coated with a primer for purposes of corrosion protection and painting.

As viewed by the observer, the illustration shows a top view into the interior of housing 101, with the inner side of base surface 104 facing the observer. An electromechanical transducer element 106, in the present case a cylindrical disk-shaped piezoelectric element, for example, is affixed, for example glued, to the inner side of base surface 104 and contacted. The illustration of the contacting has been omitted in the drawing for the sake of clarity. The remaining space inside housing 101 is filled with a damping material, likewise not illustrated. Shown housing 101 may also be enclosed by further casings made of soft elastomers, for example.

Base surface 104 has the approximate shape of a rectangle having short, rounded sides. In the middle, the rectangle is widened by circular segment-shaped protrusions 132 which surround the mounting site of transducer element 106. At its upper edge, in the observer's line of sight in FIG. 1A, side wall 102 has an edge face which is parallel to the plane of the drawing and to base surface 104, and which is delimited by two concentric circular lines whose midpoint lies on an axis of symmetry 134, relative to which an outer contour 120 of housing 101 has a rotationally symmetrical design.

Figure 1B:
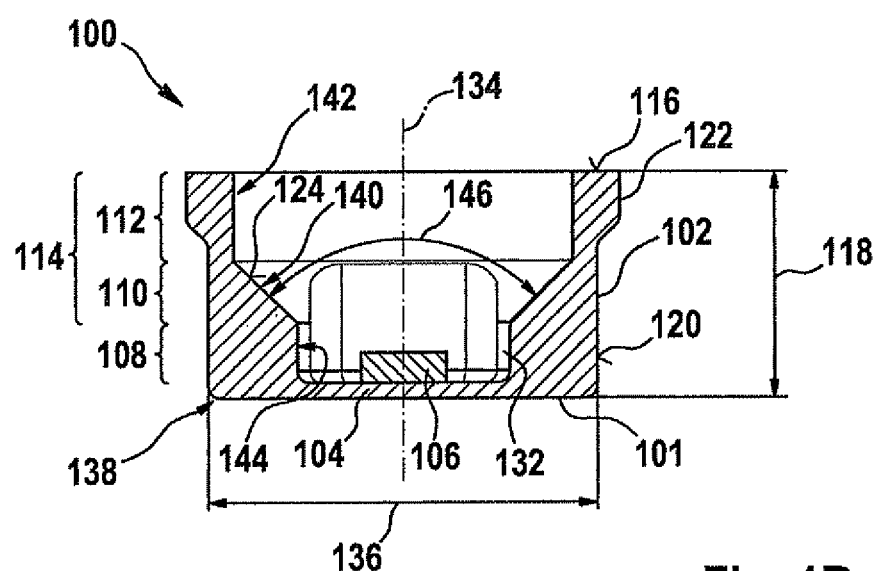
FIG. 1B shows a sectional view of the ultrasonic sensor from FIG. 1A.

FIG. 1B shows a sectional view of ultrasonic sensor 100 from FIG. 1A along a section plane, denoted by B-B in FIG. 1A, which passes through axis of symmetry 134 of outer contour 120. Outer contour 120 is formed over the predominant portion of an overall height 118 of housing 101 in the shape of a cylinder having an outer diameter 136, the cylindrical axis lying on axis of symmetry 134. Outer contour 120 deviates from a cylindrical shape, in that a thickening 122 which acts as a stabilizing ring is provided at upper edge 116 of housing 101, and in addition, lower edge 138 of side wall 102 is rounded at the location where side wall 102 meets the outer side of base surface 104.

While outer contour 120 is rotationally symmetrical with respect to axis of symmetry 134 in the specific embodiment shown, inner contour 124 deviates significantly from a rotationally symmetrical shape. In a lower side wall section 108 which directly adjoins base surface 104, inner contour 124 is perpendicular 144, so that in lower side wall section 108 side wall 102 has the shape of an extruded body, i.e., having a constant cross-sectional shape in a plane which is arbitrarily selectable within lower side wall section 108, parallel to base surface 104 and extending above same. Since inner contour 124 follows the rotationally asymmetrical contour of base surface 104 illustrated in FIG. 1A, the cross-sectional shape of side wall 102 in lower side wall section 108 is rotationally asymmetrical. In the present exemplary embodiment, in addition the thickness of side wall 102 is not constant in lower side wall section 108.

In an upper wall section 114 of side wall 102 which adjoins lower wall section 108, inner contour 124 successively changes from the rotationally asymmetrical cross-sectional shape, which it has in lower side wall section 108, to a rotationally symmetrical shape at upper edge 116. In the present specific embodiment, upper side wall section 114 includes a transition section 110 and an edge section 112, in which inner contour 124 is oriented perpendicularly and rotationally symmetrically with respect to axis of symmetry 134 of outer contour 120, i.e., follows a cylindrical surface 142 whose cylindrical axis coincides with axis of symmetry 134. The inner diameter of cylindrical surface 142 is selected in such a way that the cylindrical surface completely encloses the rotationally asymmetrical contour of base surface 104 in the projection along axis of symmetry 134. It is apparent from FIG. 1A that short sides 130 of the approximately rectangular contour of base surface 104 are rounded specifically in such a way that in the projection along axis of symmetry 134 they coincide with cylindrical inner contour 124 in edge section 112.

In contrast, in transition section 110 inner contour 124 extends in sections which are situated in the projection along axis of symmetry 134 outside the contour of base surface 104, along a lateral surface 140 of a downwardly tapering cone whose vertex lies on axis of symmetry 134. In the perpendicular section plane extending through axis of symmetry 134 of FIG. 1E, this corresponds to a straight sectional contour which extends at an angle with respect to axis of symmetry 134 or base surface 104. Aperture angle 146 of the cone may be 90°, for example, so that the lateral surface is inclined by an angle of 45° with respect to axis of symmetry 134. On the other hand, in sections which lie in the projection along axis of symmetry 134 within the contour of base surface 104, inner contour 124 extends perpendicularly in a continuation of its perpendicular shape in lower side wall section 108.

Upper side wall section 114 extends over more than 50% of overall height 118 of side wall 102, i.e., of housing 101. Since the shape of inner contour 124 successively widens in upper side wall section 114 with respect to upper edge 116, while outer contour 120, with the exception of thickening 122 formed at upper edge 116, extends essentially cylindrically, i.e., having a constant outer diameter 136, the overall result is a successive tapering of outer edge 102 in upper side wall section 114.

Figure 1C:
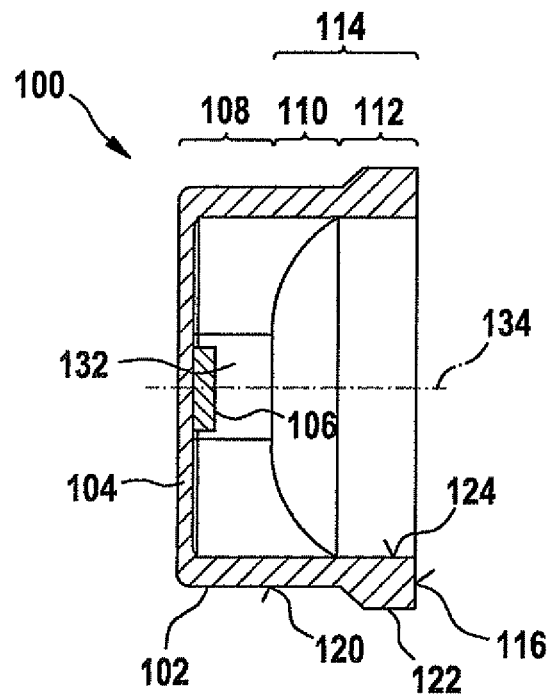
FIG. 1C shows another sectional view of the ultrasonic sensor from FIG. 1A.

FIG. 1C shows another sectional view of ultrasonic sensor 100 from FIG. 1A along a section plane denoted by C-C in FIG. 1A, which likewise passes through axis of symmetry 134 of outer contour 120. In alternative specific embodiments an edge section 112, for example, in which inner contour 124 of side wall 102 extends cylindrically, may be dispensed with, so that upper side wall section 114 includes only a transition section 110, and side wall 102 does not assume a rotationally symmetrical shape until it reaches upper edge 116.

Figure 2:
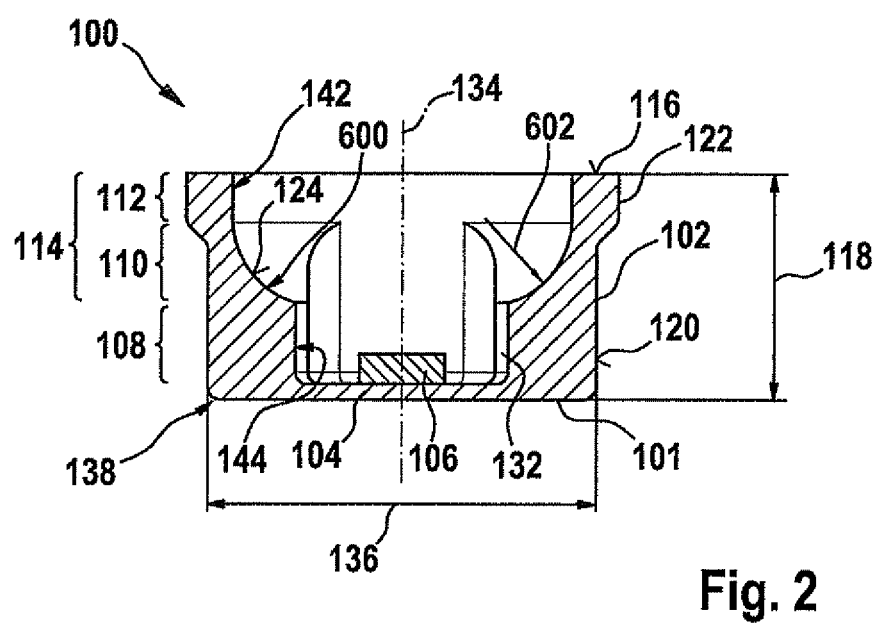
FIG. 2 shows a sectional view of an ultrasonic sensor according to another specific embodiment, having a quarter-circle-shaped inner contour.
Figure 3:
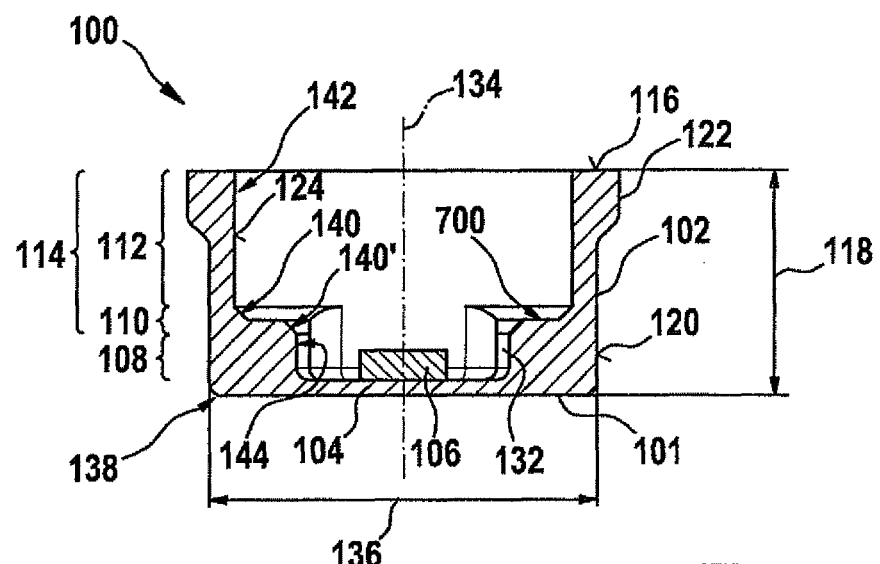
FIG. 3 shows a sectional view of an ultrasonic sensor according to another specific embodiment, having an inner contour which is linear in places.

FIGS. 2 and 3 each show sectional views of further specific embodiments of ultrasonic sensors 100, in which the shape of inner contour 124 in transition section 110 in the present described specific embodiment is different from conical surface 140 illustrated in FIG. 1B. The section planes of the sectional views of FIGS. 2 and 3 each extend through axis of symmetry 134 of outer contour 120 of housing 101. Base surface 104 of housing 101, the same as for the specific embodiment from FIGS. 1A-C, has an approximately rectangular shape, resulting in essentially the same top view as in FIG. 1A; a separate illustration corresponding to top views of the specific embodiments of FIGS. 2 and 3 has been omitted. The section planes of FIGS. 2 and 3 extend along the longitudinal axis of the approximately rectangular base surface 104, corresponding to the illustration in FIG. 1B.

In the specific embodiment of FIG. 2, inner contour 124 in transition section 110 is designed in such a way that, in the sectional illustration shown, instead of the linear, angled sectional contour 140 in FIG. 1B it has a curved sectional contour 600 which smoothly adjoins cylindrical shape 142 of inner contour 124 in edge section 112, and continues downward with a continuously decreasing inclination with respect to base surface 104. Curved sectional contour 600 has a radius of curvature 602 which is constant over the curvature and which may be selected in such a way, for example, that at its lower end, curved sectional contour 600 is inclined parallel to base surface 104, i.e., has an overall quarter circle shape.

In the specific embodiment of FIG. 3, in the sectional illustration, inner contour 124 in transition section 110 has a sectional contour which in places is composed of straight contour sections 140, 700, 140'. A first contour section 140, which adjoins cylindrical shape 142 of inner contour 124 in edge section 112, extends at an angle of 45° relative to base surface 104. A first contour section 140 is adjoined by a second contour section 700 which extends parallel to base surface 104, and a third contour section 140' which once again extends at an angle of 45° relative to base surface 104.

Alternative specific embodiments may also provide a strictly stepwise transition between edge section 112 and lower side wall section 108, so that edge section 112, without a transition section 110 of finite height, directly adjoins lower side wall section 108. The shape of inner contour 124, unlike that in FIG. 3, may be composed of sections which in places have a stepped shape, i.e., in a perpendicular sectional view as in FIG. 1B, have a horizontal sectional contour, a conical shape, i.e., in a likewise sectional view, having a straight angled sectional contour, and/or a sectional contour having a circular or other curved shape. For example, a shape having a quarter-circle-shaped sectional contour may also be approximated by a shape of inner contour 124 which in places has conical and/or stepped sections.

During operation of ultrasonic sensor 100, piezoelectric transducer element 106 is acted on by a control unit in an alternating, pulsed manner via an electrical excitation signal which generates a corresponding electrical field perpendicular to base surface 104. When the polarization is suitably oriented, the electrical field generates, for example, a contraction of transducer element 106 transverse to the applied electrical field. This contraction of transducer element 106 tangential to base surface 104 causes base surface 104 to bend according to the so-called flexed arch principle.

For achieving the greatest possible deflections, it is advantageous to apply an actuating signal having a frequency which corresponds to a mechanically possible, for example approximately rotationally symmetrical, base mode, working mode, or upper mode of the base surface. Using suitable electrical wiring of transducer element 106 in the control unit, the mechanical bandwidth of the working mode is enlarged to the extent that short ultrasonic pulses requiring a large bandwidth may be transmitted. For pulsed transmission excitation of transducer element 106, further secondary modes are excited which typically correspond to tilting and crumpling motions of side wall 102. These modes are electrically uncompensated, and therefore have low bandwidth, i.e., large time constants.

Figure 5A:
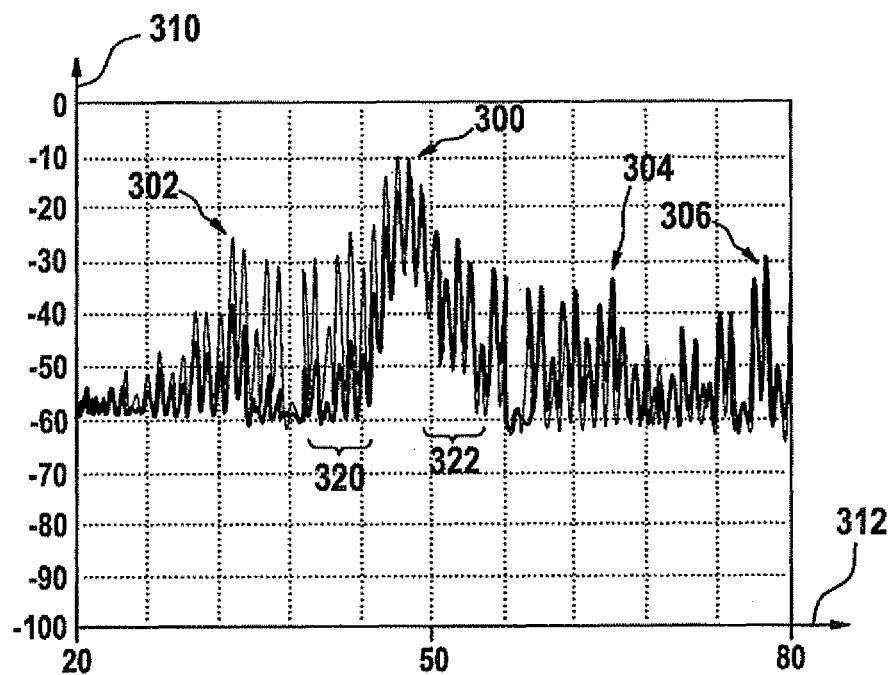
FIG. 5A shows a frequency spectrum of an ultrasonic signal emitted by a conventional ultrasonic sensor.

FIG. 5A shows a frequency spectrum of an ultrasonic signal emitted by a conventional ultrasonic sensor in the frequency range between 20 kHz and 80 kHz, recorded by laser interferometry. The frequency, in units of kHz, is plotted linearly along a horizontal axis 312, while the logarithmic spectral intensity, in dB, is plotted along a vertical axis 310 in relation to a comparative output of 1 mW. In the illustrated spectrum, multiple individual curves illustrated using different line thicknesses are superimposed, the curves being obtained by measurements at various points of the vibrating base surface of the ultrasonic sensor. The frequency spectrum has a clear maximum 300 in the range of a working mode at 48 kHz, and further secondary maxima 302, 304, 306, which correspond to interfering secondary modes 33 kHz, 67 kHz, and 75 kHz, respectively, which interfere with operation of the ultrasonic sensor.

Figure 5B:
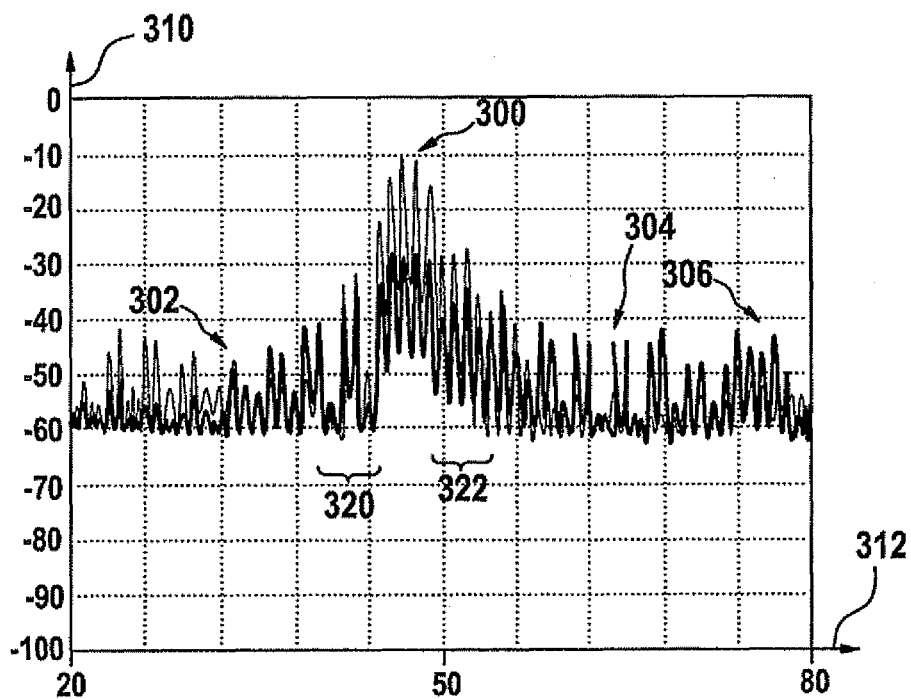
FIG. 5B shows a frequency spectrum of an ultrasonic signal emitted by an ultrasonic sensor according to one specific embodiment.

FIG. 5B shows a similarly obtained frequency spectrum of an ultrasonic signal emitted by an ultrasonic sensor according to one specific embodiment of the present invention. Compared to FIG. 3A, maximum 300 in the range of the working mode at 48 kHz is present with unchanged intensity, including directly adjacent side bands 320, 322. In contrast, the intensities of undesired secondary modes 302, 304, 306 are significantly reduced by factors of from 5 to 10.

Figure 4:
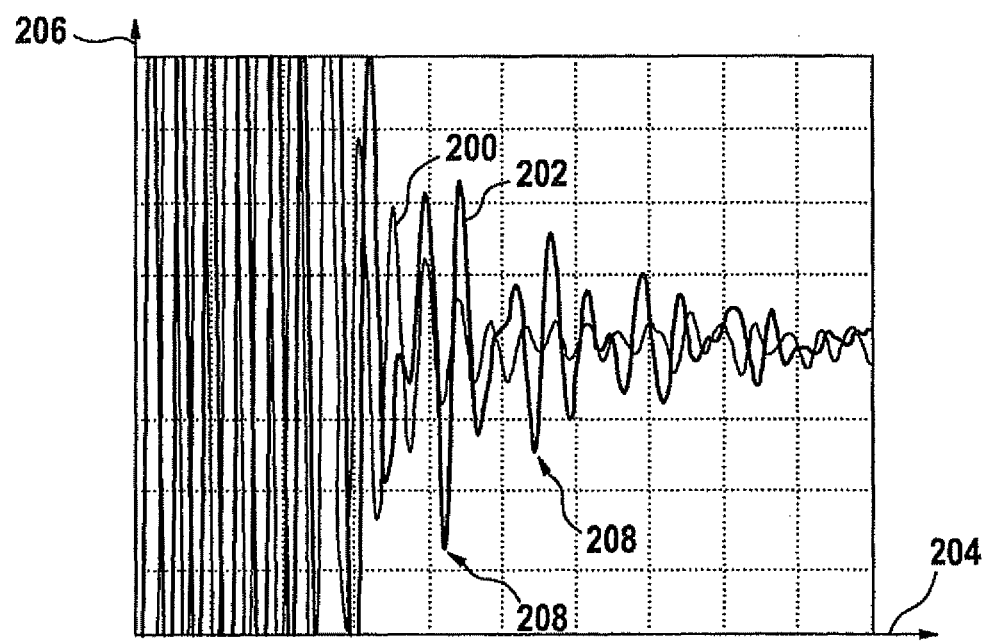
FIG. 4 shows a diagram of a signal curve received by an ultrasonic sensor according to one specific embodiment of the present invention, together with a comparative curve.

FIG. 4 shows a diagram having two signal curves 200, 202 of two reception signals which are represented on a shared time axis 204 in different line thicknesses, a first reception signal 202 having been received by an ultrasonic sensor of conventional design, and a second reception signal 200 having been received by an ultrasonic sensor according to one specific embodiment of the present invention. Vertical axis 206 shows the particular signal level of the electrical voltage signal obtained. Clearly apparent in first reception signal 202 are beats 208 in reception signal 202 caused by secondary modes which impair the proximity measuring capability of the conventional ultrasonic sensor. Such beats are effectively suppressed in second reception signal 200.

What is claimed is:

1. An ultrasonic sensor, comprising:
    a transducer element for generating ultrasonic vibrations;
    a housing, which has a circumferential side wall and a base surface on which the transducer element is mounted;
        wherein the side wall has a lower side wall section in which the side wall has an essentially rotationally asymmetrical profile in a plane parallel to the base surface, and an upper side wall section in which the side wall changes to an essentially rotationally symmetrical profile toward an upper edge of the side wall.

2. The ultrasonic sensor of claim 1, wherein the side wall in the upper side wall section is at least predominantly tapered compared to the lower side wall section.

3. The ultrasonic sensor of claim 1, wherein the upper side wall section extends over more than 50% of an overall height of the housing.

4. The ultrasonic sensor of claim 1, wherein in the lower side wall section and the upper side wall section, the housing has an essentially cylindrical outer contour.

5. The ultrasonic sensor of claim 1, wherein the side wall has a circumferential outer thickening in the upper side wall section.

6. The ultrasonic sensor of claim 1, wherein the upper side wall section extends over more than 50% and less than 80% of an overall height of the housing.

7. The ultrasonic sensor of claim 1, wherein the side wall has a circumferential outer thickening in the upper side wall section, at the upper edge.

8. The ultrasonic sensor of claim 1, wherein the upper side wall section includes a curved shape of an inner contour of the housing with respect to a plane which is perpendicular to the base surface, and wherein the shape is essentially quarter-circle-shaped.

9. The ultrasonic sensor of claim 1, wherein an inner contour of the side wall includes a curved shape having a radius of curvature such that at its lower end the curved shape is parallel to the base surface.

10. An ultrasonic sensor, comprising:
    a transducer element for generating ultrasonic vibrations;
    a housing, which has a circumferential side wall and a base surface on which the transducer element is mounted;
        wherein the side wall has a lower side wall section in which the side wall has an essentially rotationally asymmetrical profile in a plane parallel to the base surface, and an upper side wall section in which the side wall changes to an essentially rotationally symmetrical profile toward an upper edge of the side wall, wherein the upper side wall section includes a shape of an inner contour of the housing which is inclined by approximately 45° relative to a plane which is perpendicular to the base surface.

11. The ultrasonic sensor of claim 1, wherein the upper side wall section includes a curved shape of an inner contour of the housing with respect to a plane which is perpendicular to the base surface.

12. The ultrasonic sensor of claim 1, wherein the upper side wall section includes a stepped shape of an inner contour of the housing with respect to a plane which is perpendicular to the base surface.

13. A parking assistance system for a vehicle, comprising:
    a control unit; and
    an ultrasonic sensor, the ultrasonic sensor, including:
        a transducer element for generating ultrasonic vibrations;
        a housing, which has a circumferential side wall and a base surface on which the transducer element is mounted;
            wherein the side wall has a lower side wall section in which the side wall has an essentially rotationally asymmetrical profile in a plane parallel to the base surface, and an upper side wall section in which the side wall changes to an essentially rotationally symmetrical profile toward an upper edge of the side wall.

14. A method for manufacturing an ultrasonic sensor, the method comprising:
    providing a housing having a circumferential side wall and a base surface so that the side wall has a lower side wall section having an essentially rotationally asymmetrical profile in a plane parallel to the base surface, and having an upper side wall section in which the side wall changes to an essentially rotationally symmetrical profile toward an upper edge of the side wall; and
    mounting a transducer element for generating ultrasonic vibrations on the base surface.

* * * * *

UNITED STATES PATENT AND TRADEMARK OFFICE
CERTIFICATE OF CORRECTION

PATENT NO.        : 8,671,762 B2
APPLICATION NO.   : 13/056581
DATED             : March 18, 2014
INVENTOR(S)       : Martin Reiche It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this
Twenty-ninth Day of September, 2015

Michelle K. Lee
*Director of the United States Patent and Trademark Office*